Patented Aug. 15, 1950

2,519,037

UNITED STATES PATENT OFFICE 2,519,037

PREPARATION OF 3'-BROMO-4'-METHYL-2-BENZOYLBENZOIC ACID

Richard C. Franklin, Wilmington, Del., assignor to E. I. du Pont de Nemours and Company, Wilmington, Del., a corporation of Delaware No Drawing. Application July 15, 1949, Serial No. 105,074

1 Claim. (Cl. 260—517)

This invention relates to an improved process for the preparation of 3'-bromo-4'-methyl-2-benzoylbenzoic acid which is particularly useful in the preparation of 2-bromo-3-methyl anthraquinone.

Various attempts have been made to produce 3'-bromo-4'-methyl-2-benzoylbenzoic acid by direct bromination of p-toluylbenzoic acid in solvents such as acetic acid, sulfuric acid and organic solvents, but in general these processes have resulted in such an impure product that other methods have been resorted to for the preparation of this intermediate which, however, because of the difficulty involved in its preparation, has never come into wide commercial use. It was found that, in attempting to brominate p-toluylbenzoic acid in such media as acetic acid and sulfuric acid, the resulting products were dibromo derivatives, and where sulfuric acid was employed bromination in the side chain took place as well as in the ring. Because the 3'-bromo-4'-methyl-2-benzoylbenzoic acid on ring closure is converted in high yields to 2-bromo-3-methylanthraquinone without the formation of any material amount of isomeric compounds which would require separation therefrom, and the 2-bromo-3-methylanthraquinone is a valuble intermediate for the preparation of dyes, considerable work has been carried out in an attempt to perfect a commercially suitable process for the preparation of this intermediate.

It is an object of this invention to provide a simple and economical process for preparing 3'-bromo-4'-methyl-2-benzoylbenzoic acid in a high state of purity and in essentially theoretical yields.

I have found that, where p-toluylbenzoic acid is brominated in sulfuric acid in the presence of sulfuryl chloride at temperatures of from 35° to 70° C., 3'-bromo-4'-methyl-2-benzoylbenzoic acid is obtained directly in a state of high purity and in essentially theoretical yields. The sulfuric acid employed as a reaction medium should be of from 82.5% to 92.5% strength, and preferably of approximately 87% strength. In this particular strength of sulfuric acid the amount of bromine employed may range from 1.0 to 2.0 atoms per mol of p-toluylbenzoic acid. The amount of sulfuryl chloride added to the sulfuric acid should be from 1.0 to 2.5 molar equivalents per atom of bromine employed in the reaction, and the sulfuryl chloride may be added either to the sulfuric acid mixture before the addition of the bromine, or as a solution with the bromine, or in both ways if desired. The bromine is preferably added to the sulfuric acid solution of the p-toluylbenzoic acid.

The following examples are given to illustrate the invention. The parts used are by weight, unless otherwise specified.

Example 1

One hundred (100) parts of p-toluylbenzoic acid and 300 parts of 87% sulfuric acid are heated to 55° C. To this solution a mixture of 57.5 parts of bromine and 95 parts of sulfuryl chloride is added gradually over a period of 8 hours at a temperature of 55°–58° C. and then held 10 hours longer. At the end of this period water is added to the mixture to reduce the acid strength to approximately 65% and then the mass is drowned into cold water. The 3'-bromo-4'-methyl-2-benzoylbenzoic acid is isolated by filtering, washing with water and drying, and is obtained in a yield of about 95% of the theoretical. It contains 25.7% bromine and has a melting range of 176.0° to 178.0° C. After recrystallization from 50% alcohol the product has a melting range of 183.0° to 184.0° C.

Since the bromination of the p-toluylbenzoic acid is carried out in sulfuric acid of relatively high concentration, the resulting 3'-bromo-4'-methyl-2-benzoylbenzoic acid can be ring closed directly to the 2-bromo-3-methylanthraquinone without isolation from the bromination mass by adding oleum to the bromination mixture to bring the sulfuric acid to the desired concentration and then heating so that the ring closure is carried out in the manner ordinarily employed in the ring closure of benzoylbenzoic acid compounds.

The following example illustrates this combined process.

Example 2

One hundred (100) parts of p-toluylbenzoic acid, 300 parts of 87.5% sulfuric acid and 28.2 parts of sulfuryl chloride are mixed at 25° C., and a mixture of 38.7 parts of bromine and 84.5 parts of sulfuryl chloride is added over a 5 hour period at 25° C. The reaction mass is heated slowly to 50°–55° C. and held for 13 hours. An additional mixture of 14.5 parts of bromine and 31.7 parts of sulfuryl chloride is added at 50° C. and the mass agitated for 12 hours longer to bring the bromine content to 24.7%.

Seven hundred (700) parts of 25% oleum are then added to the bromination mixture, the mass heated to 95° C. and held one hour to complete the ring closure. Two hundred and two (202) parts of water are added at 90°–95° C. to cut the acid strength to 83%. The 2-bromo-3-methylanthraquinone is filtered off, washed with 250 parts of 80% sulfuric acid, and the cake hydrolyzed in cold water. The yield is from 60% to 70% of the theoretical yield of a product analyzing 27.2% bromine, and having a melting range of 219.0° to 220.0° C.

Alternatively, the isolated 3'-bromo-4'-methyl-2-benzoylbenzoic acid may be ring closed to the 2-bromo-3-methylanthraquinone by heating in 98% sulfuric acid or up to 10% oleum at temperatures of from 95° to 100° C. for one hour and the resulting 2-bromo-3-methylanthraquinone can be directly isolated in relatively pure form from this mixture by diluting the acid solution to approximately 83% strength while maintaining a temperature of from 90° to 95° C., filtering off and washing the product with 80% sulfuric acid, then with cold water. In this manner a yield of 2-bromo-3-methylanthraquinone is obtained in approximately 75% to 80% of theory and of a purity substantially that obtained in Example 2.

In carrying out the bromination of the p-toluylbenzoic acid, it is essential that the sulfuryl chloride be present in the bromination solution at the time the bromine is added, so that the sulfuryl chloride may be added to the reaction mixture either prior to the addition of the bromine or as a mixture therewith.

The use of sulfuryl chloride as a catalyst in this reaction appears to be specific to the use of a diluted sulfuric acid, for when employed in solvent brominations of the p-toluylbenzoic acid the resulting product on ring closure appears to give no isolatable 2-bromo-3-methylanthraquinone, and when sulfuryl chloride alone is used as the solvent medium a large amount of chlorine is introduced into the product.

The process as above described yields 3'-bromo-4'-methyl-2-benzoylbenzoic acid of high purity in high yields and lends itself to the direct conversion of this product to the 2-bromo-3-methylanthraquinone without isolation.

I claim:

A process for the preparation of 3'-bromo-4'-methyl-2-benzoylbenzoic acid which comprises carrying out the bromination of p-toluylbenzoic acid with bromine in sulfuric acid of from 82.5% to 92.5% strength with 1.0 to 2.0 atoms of bromine per mol of p-toluylbenzoic acid in the presence of from 1.0 to 2.0 molar equivalents of sulfuryl chloride per atom of bromine employed.

RICHARD C. FRANKLIN.

REFERENCES CITED

The following references are of record in the file of this patent:

FOREIGN PATENTS

| Number | Country | Date |
|--------|---------|------|
| 297,018 | Germany | Mar. 14, 1917 |
| 560,352 | Germany | Oct. 1, 1932 |